United States Patent [19]

Kellar et al.

[11] 4,277,276

[45] Jul. 7, 1981

[54] METHOD AND APPARATUS FOR SHAPING GLASS SHEETS USING DEFORMABLE VACUUM MOLD

[75] Inventors: John D. Kellar, Pontypool; Gordon F. Pereman, Columbus, both of Canada

[73] Assignee: PPG Industries, Inc., Pittsburgh, Pa.

[21] Appl. No.: 130,783

[22] Filed: Mar. 17, 1980

[51] Int. Cl.³ .......................................... C03B 21/00
[52] U.S. Cl. .................................... 65/106; 65/104; 65/107; 65/268; 65/273; 65/287; 65/291
[58] Field of Search ................ 65/104, 107, 273, 268, 65/287, 291, 106

[56] References Cited

U.S. PATENT DOCUMENTS

| | | | |
|---|---|---|---|
| 2,182,448 | 12/1939 | Paddock | 65/287 |
| 2,663,974 | 12/1953 | Thomson | 65/289 |
| 3,077,753 | 2/1963 | Dammers | 65/106 |
| 3,106,464 | 10/1963 | Dammers | 65/291 |
| 3,265,484 | 8/1966 | Ritter | 65/104 |
| 3,389,984 | 6/1968 | Englehart et al. | 65/287 |
| 3,459,521 | 8/1969 | Nedelec | 65/104 X |
| 3,607,187 | 9/1971 | McMaster | 65/106 |
| 3,846,104 | 11/1974 | Seymour | 65/104 |
| 4,092,141 | 5/1978 | Frank et al. | 65/273 X |
| 4,202,681 | 5/1980 | McMaster et al. | 65/104 |
| 4,204,853 | 5/1980 | Seymour | 65/106 |
| 4,204,854 | 5/1980 | McMaster et al. | 65/106 |

*Primary Examiner*—Arthur D. Kellogg
*Attorney, Agent, or Firm*—Edward I. Mates

[57] ABSTRACT

Glass sheets are shaped while heat-softened by engaging a surface thereof against an apertured surface of a deformable vacuum mold and deforming the vacuum mold while maintaining the heat-softened glass sheet in vacuum engagement thereagainst.

9 Claims, 6 Drawing Figures

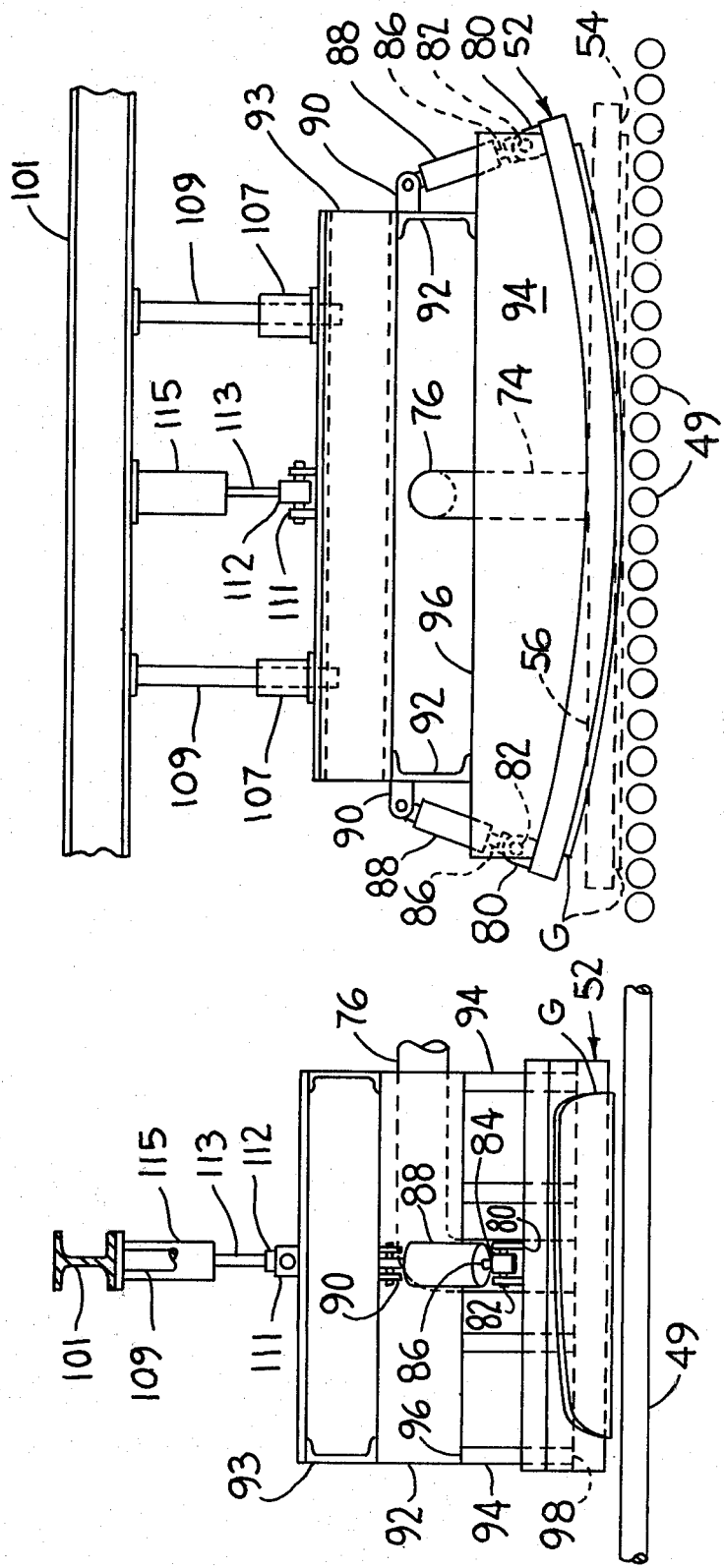

METHOD AND APPARATUS FOR SHAPING GLASS SHEETS USING DEFORMABLE VACUUM MOLD

BACKGROUND OF THE INVENTION

1. Field of the Invention

This invention relates to shaping and cooling glass sheets and particularly to the high speed production of bent glass sheets that are toughened by air quenching, and most particularly, for shaping and heat treating relatively thin glass sheets, particularly those having a nominal thickness of ⅛ inch (3.2 mm) or less. Thinner glass sheets sag more readily than thicker glass sheets at any given elevated temperature above the glass deformation temperature. Hence, it is more difficult to control the shape imparted to thinner glass sheets.

Shaped and tempered glass sheets are widely used as side windows or rear windows in vehicles such as automobiles or the like and, to be suitable for such application, flat glass sheets must be shaped to precisely defined curvatures dictated by the shape and outline of the frames defining the window openings into which the glass side or rear windows are installed. It is also important that the side or rear windows meet stringent optical requirements and that the windows be free of optical defects that would tend to interfere with the clear viewing therethrough in their viewing area.

During fabrication, glass sheets intended for use as shaped windows in vehicles are subjected to thermal treatment to temper the glass for strengthening the same and increasing the resistance of the shaped window to damage resulting from impact. In addition to increasing the resistance of a glass sheet to breakage, tempering also causes a glass sheet to fracture into relatively small, relatively smoothly surfaced fragments that are less injurious than the relatively large, jagged fragments that result from the more frequent breakage of untempered glass.

The commercial production of shaped glass sheets for such purposes commonly includes heating flat sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of said path into a shaping station where each glass sheet in turn is transferred onto a vacuum mold. The vacuum mold lifts and holds the heat-softened glass sheet by suction. At about the same time, a transfer and tempering ring having an outline shape conforming to that desired for the glass sheet slightly inboard of its perimeter moves upstream into a position below the vacuum mold. Release of the vacuum deposits the glass sheet onto the tempering ring. The tempering ring supports the peripheral portion of the glass sheet while it conveys the glass sheet into a cooling station for rapid cooling.

In prior art apparatus, the vacuum mold was either provided with a lower, rigidly curved shaping surface that shaped the heat-softened glass sheet incrementally by suction thereagainst or had a smoothly surfaced flat shaping surface that lifted the flat glass sheet by suction thereagainst and depended on a release of the vacuum within the mold to permit the hot glass sheet to drop by gravity or by a combination of gravity and an additional force onto the tempering ring to develop the shape dictated by the outline configuration of the tempering ring. Such processes as the latter have been called drop forming.

When a rigid, curved surface is adjacent a heat-softened flat glass sheet during the application of suction through said surface, much power is need to obtain the suction necessary to lift and shape a hot glass sheet simultaneously by suction at a rate sufficiently rapid to provide a high speed mass production operation for shaping and tempering glass sheets. When a flat glass sheet is shaped by drop forming, the maximum depth of bend obtainable depends on the glass thickness, glass temperature and distance the glass is dropped. It is difficult to control the shape of thin glass sheets, particularly those heated to excessive temperature. Furthermore, if the drop distance is increased to make possible a deeper bend, more time is needed to lift the glass sheet the longer drop distance, thereby limiting the maximum rate at which bent and tempered glass sheets can be produced.

2. The Prior Art

U.S. Pat. No. 2,663,974 to Robert W. Thomson bends heat softened glass sheets between flexible strips of metal that are weighted and a pair of rigid glass sheet support members that have upper edge surfaces curved convexly in elevation to conform to the shape desired for a rectangular glass sheet after it has been shaped. The weighted strips bear down on the upper surface of the glass sheet to distort the latter to conform to the convexly curved upper edge surfaces. No vacuum or transfer device is included in this apparatus.

U.S. Pat. No. 3,077,753 to August Dammers discloses a press bending mold in which a vertically suspended, heat softened glass sheet is press bent against a rigid, convexly curved, forming dye by pressing a resilient sheet of fabric that is spring loaded to apply pressure against the surface of the glass sheet opposite the surface that faces the rigid die of convex configuration. No transfer to a second shaping member and no vacuum operation is included in this patented construction.

U.S. Pat. No. 3,106,464 to August Dammers moves a rigid die of convex configuration against one surface of a heat softened glass sheet while the opposite surface is forced against a flexible frame to shape the glass sheet and the frame. The frame is then shaped still further at its ends by pistons that engage the opposite ends of the frame against the ends of the convex die. There is no vacuum used in the bending method of this patent.

U.S. Pat. No. 3,265,284 to George F. Ritter Jr. discloses a flexible belt that is located between an upper pressing mold of convex configuration and a lower mold of concave configuration. The lower mold is lifted to bring a heat softened glass sheet carried by the flexible belt into engagement against the downwardly facing surface of the upper mold. When the lower mold retracts, the belt moves the shaped glass sheet onto a roller conveyor that transports the glass through a quenching area where it is cooled. The lack of peripheral support for the glass sheet causes a loss of shape control so that the ultimate shape of the glass sheet after it is cooled can not be controlled from the shape imparted at the press bending station where the glass sheet supported on the flexible belt is sandwiched in pressurized engagement between the upper and lower molds.

U.S. Pat. No. 3,389,984 to Oscar D. Englehart and James S. Shuster is similar to the aforementioned Ritter patent in providing a flexible ribbon of material superimposed over the shaping surface of a pressing mold of concave configuration to provide a run between said concave mold and one surface of a heat softened glass sheet to be press bent. In this patent, the glass sheet is suspended from tongs. The other surface of the glass sheet faces a press bending mold of convex configuration. Relative movement of the molds toward one another presses a shape onto the glass sheet. The glass sheet is then supported solely by tongs for transfer into a cooling area where stresses are imparted to the glass depending upon the rate of cooling. Lack of peripheral support and lack of a vacuum support characterize this press bending operation.

U.S Pat. No. 3,459,521 to Nedelec supports a flat glass sheet on a hammock while the glass sheet in a heat softened state is pressed between upper and lower molds of complementary configuration. The glass sheet is somehow removed from the hammock and quenched.

U.S. Pat. No. 3,607,187 to Harold A. McMaster lifts a soft, flat glass sheet by lowering a vacuum mold toward said sheet and applying suction through a downwardly facing, permanently curved, shaping surface of a vacuum mold to shape the sheet by suction thereagainst. Much power is needed to provide the suction necessary to shape the entire flat glass sheet to conform to the permanently curved shape of the vacuum mold in incremental portions, particularly those portions most widely spaced from the vacuum mold when other portions are initially engaged by the vacuum mold. This method, if useful at all, is only practical for producing extremely shallow bends and is too time consuming for high speed production.

U.S. Pat. No. 3,846,104 to Samuel L. Seymour provides method and apparatus in which glass sheets are conveyed through a furnace on conveyor means, and heated while passing through the furnace to a temperature approaching the glass softening point. At a shaping station beyond the furnace, each glass sheet in turn is lifted by a lower outline shaping mold which raises the glass sheet into engagement with an upper vacuum mold having a shape conforming to that desired for the glass. The upper vacuum mold remains at the shaping station and holds the shaped glass thereagainst as the lower shaping mold retracts to below the level of the conveyor means. A tempering ring shaped to support the bent glass sheet adjacent its marginal or peripheral edge only, moves generally horizontally between the shaping station and a cooling station to receive each shaped glass sheet released by the vacuum mold at the shaping station and transfer it to the cooling station. Therefore, each glass sheet must be lifted in its entirety to an elevated position a minimum vertical distance for transfer to said vacuum mold, a time consuming step.

U.S. Pat. No. 4,092,141 to Robert G. Frank and De-Witt W. Lampman provides similar apparatus with vertically movable sheet transfer means for rapidly removing from the tempering ring each bent glass sheet after its surfaces harden sufficiently to permit it to be conveyed on an additional downstream conveyor. The latter provides a glass sheet supporting surface at an elevation slightly higher than the level at which the glass sheet is supported by the transfer and tempering ring. However, the apparatus of this prior art patent also provides for lifting each glass sheet toward the upper vacuum mold a substantial vertical distance since the vacuum mold remains in an elevated position between successive shaping operations to await the arrival of a subsequent glass sheet at the shaping station.

The invention of U.S. patent application Ser. No. 960,403 of Samuel L. Seymour, filed Nov. 13, 1978, for *GLASS SHEET ALIGNMENT MEANS AND METHOD OF USING*, discloses a glass sheet shaping and tempering method in which each glass sheet, upon leaving a heating furnace, is elevated by means of a flat vacuum platen which is brought into contact with the upper surface of the heat-softened, flat glass sheet. After the vacuum platen and the glass sheet rise to an elevated position, a shaping and tempering ring is conveyed into a position beneath the glass sheet, the vacuum is released, and the glass sheet drops onto the shaping and tempering ring to effect the bending by the drop forming process. The shaping and tempering ring is then retracted from beneath the vacuum platen and passed into a tempering station where blasts of air are directed onto the opposite surfaces of the drop formed glass sheet to temper the glass. While this arrangement provides a flat surface for the vacuum mold that is easier to smooth than a curved surface, and simplifies changeover from one shape to another since the bending and tempering ring is the only major element of the shaping and tempering apparatus which must be reconstructed or replaced to produce different configurations, drop forming has limitations. For example, the depth of bend that can be accomplished thereby without losing control over the overall shape of the treated glass sheet is limited.

Prior to the present invention, the glass sheet bending art lacked a glass sheet shaping and tempering technique that comprised a vacuum mold having a glass engaging surface as smooth as that of flat vacuum molds of the prior art, and that also shaped the glass sheet to a shape approximately its final desired shape before releasing the glass sheet onto a shaping and tempering ring to make it possible to increase the speed of a mass production operation for shaping and tempering glass sheets and also enable the faster operation of the present invention to be capable of shaping glass sheets to bends having a greater depth of bend then those possible using prior art versions of drop-forming apparatus.

SUMMARY OF THE PRESENT INVENTION

The present invention provides a glass sheet shaping method using apparatus that comprises a flexible upper vacuum mold capable of having a smooth, flat, downwardly facing surface when it first engages and lifts a heat-softened glass sheet by suction, and yet is capable of distorting into a shape more closely approximating the final shape desired for the bent, tempered glass sheet while the vacuum mold lifts the glass sheet into an upper position that provides clearance for the shaping and tempering ring to enter the shaping station. The present invention needs less time for each shaping cycle than prior art apparatus comprising a permanently curved vacuum mold that is used to engage and lift a heat-softened glass sheet by suction. Engaging a flat glass sheet with a deformable vacuum mold having a smooth, flat surface that engages the flat glass sheet initially as taught by the present invention reduces the likelihood of imparting a shape deviating from the glass sheet shape desired.

Changing the shape of the vacuum mold while lifting the latter with a heat-softened glass sheet engaged thereunder as taught by the present invention reduces the idle time for the shaping and tempering ring. Dropping a curved glass sheet onto an outline shaping and tempering ring of approximately the same curvature and outline as the deformed vacuum mold can be accomplished over a shorter distance than the distance needed to drop a glass sheet from a flat vacuum mold onto a curved ring. Therefore, the velocity of the glass sheet developed over the shorter distance it drops until it reaches the outline shaping and tempering ring is minimized. As a consequence, uncontrolled downward sag of the deposited glass sheet in its intermediate portion within its outline supported on the shaping and tempering ring is minimal.

In addition, reducing the distance of the drop from the vacuum mold to the shaping and tempering ring reduces the time needed to transfer the glass sheet from the vacuum mold to the shaping and tempering ring. Reducing the time required for this transfer step reduces the duration of a shaping cycle, and, consequently makes possible a higher rate of production.

The present invention provides an additional improvement over drop forming glass sheets as practiced in the prior art. When a heated flat glass sheet drops onto an outline mold having a curved shaping surface in elevation, the glass sheet slides relative to the mold. Such sliding develops skid marks that mar the optical properties of the bent glass. The present invention minimizes skid marks by drop forming glass sheets onto a shaping mold after the sheets develop a configuration that approximates the shape of the mold.

The present invention will be better understood in the light of a description of an illustrative embodiment that follows, which description includes the accompanying drawings wherein like reference numbers refer to like structural elements.

BRIEF DESCRIPTION OF THE DRAWINGS

FIG. 2 is a fragmentary end view of a portion of the embodiment of FIG. 1 with certain parts omitted or broken away to show other parts of the apparatus more clearly;

FIG. 3 is an elevational side view taken at right angle to the view of FIG. 2, showing a portion of the apparatus of FIGS. 1 and 2 with parts omitted to show a simplified illustration of the structure of a deformable vacuum shaping mold included in the preferred embodiment in full lines in its glass shaping configuration and showing in phantom its configuration while flat to engage a flat glass sheet;

DESCRIPTION OF THE PREFERRED EMBODIMENTS

Figure 1:
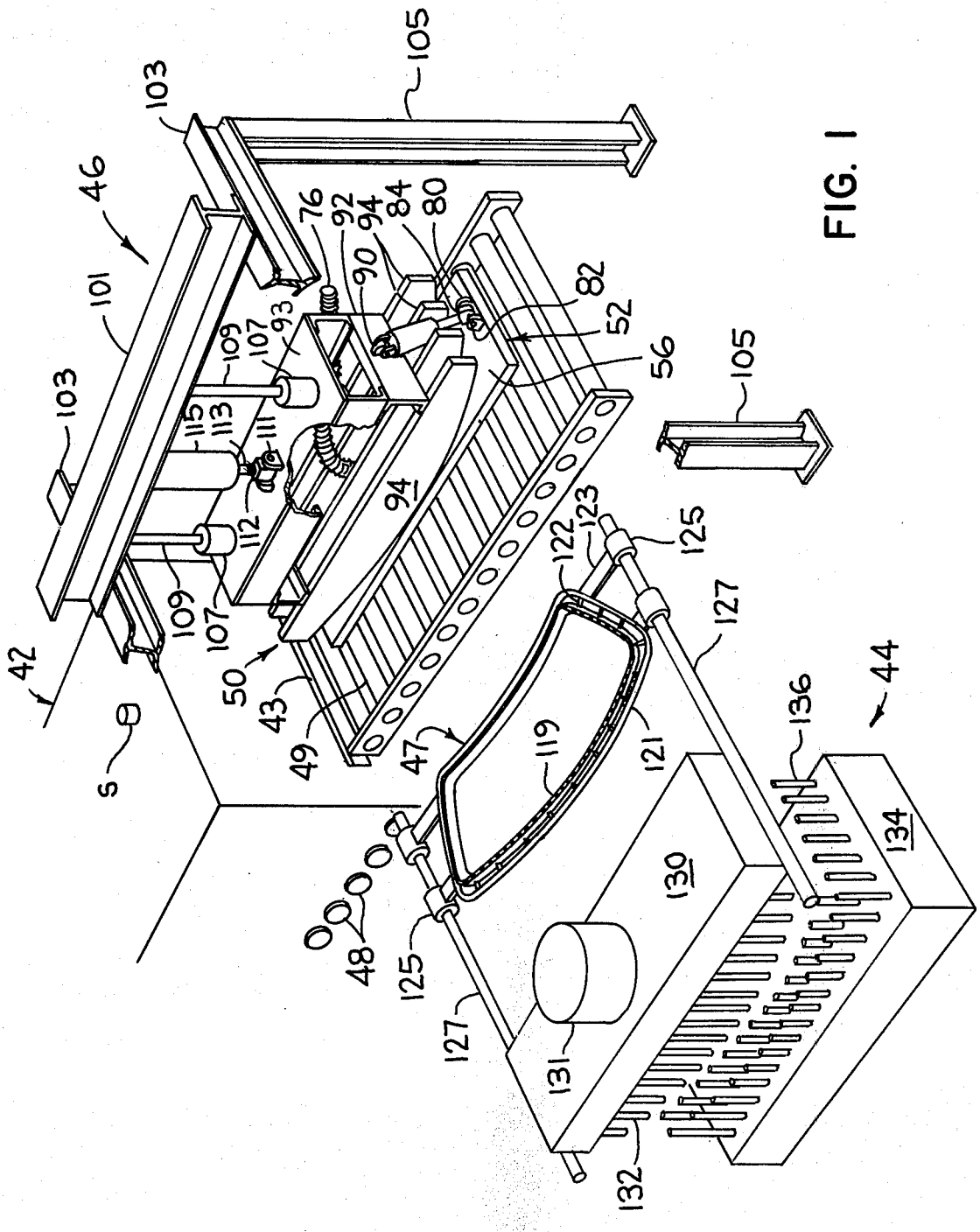
FIG. 1 is a fragmentary, perspective view of apparatus for shaping and tempering glass sheets incorporating a preferred embodiment of the present invention comprising a shaping station located beyond a roller hearth furnace, with certain parts omitted for clarity.
Figure 4:
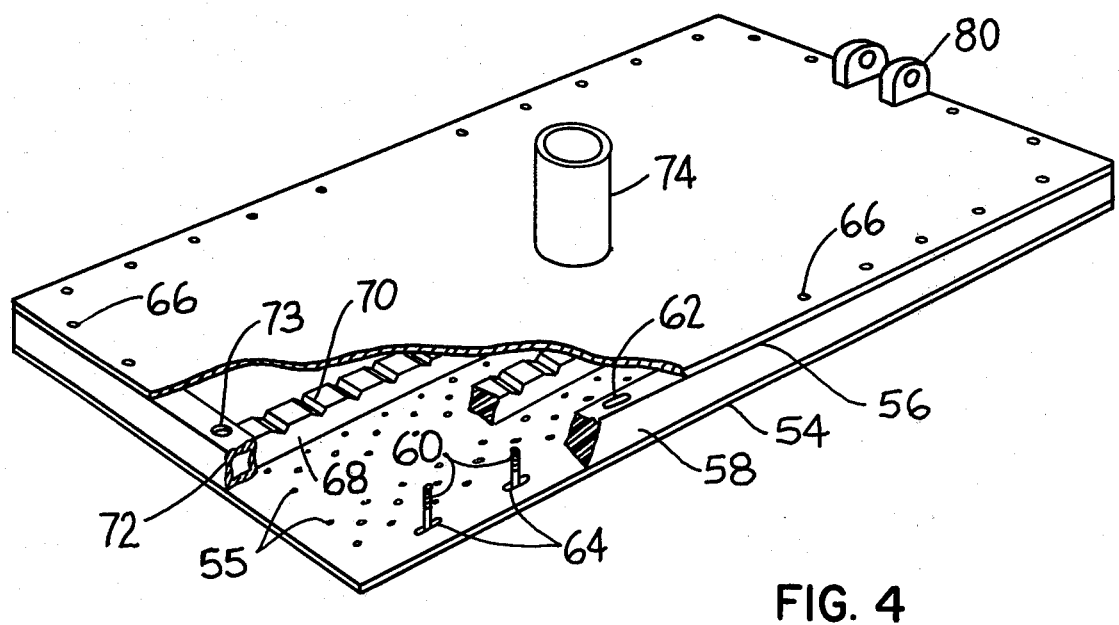
FIG. 4 is a fragmentary, perspective view of the deformable vacuum mold with parts removed to show other parts more clearly.
Figure 5:
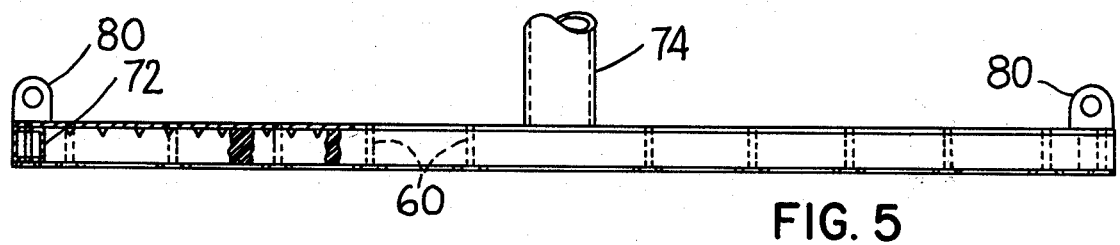
FIG. 5 is a longitudinal sectional view of the deformable vacuum mold of FIG. 4, showing its deformable shaping surface in its flat configuration to lift and shape a flat glass sheet; and with certain parts omitted to show certain interior structural elements.
Figure 6:
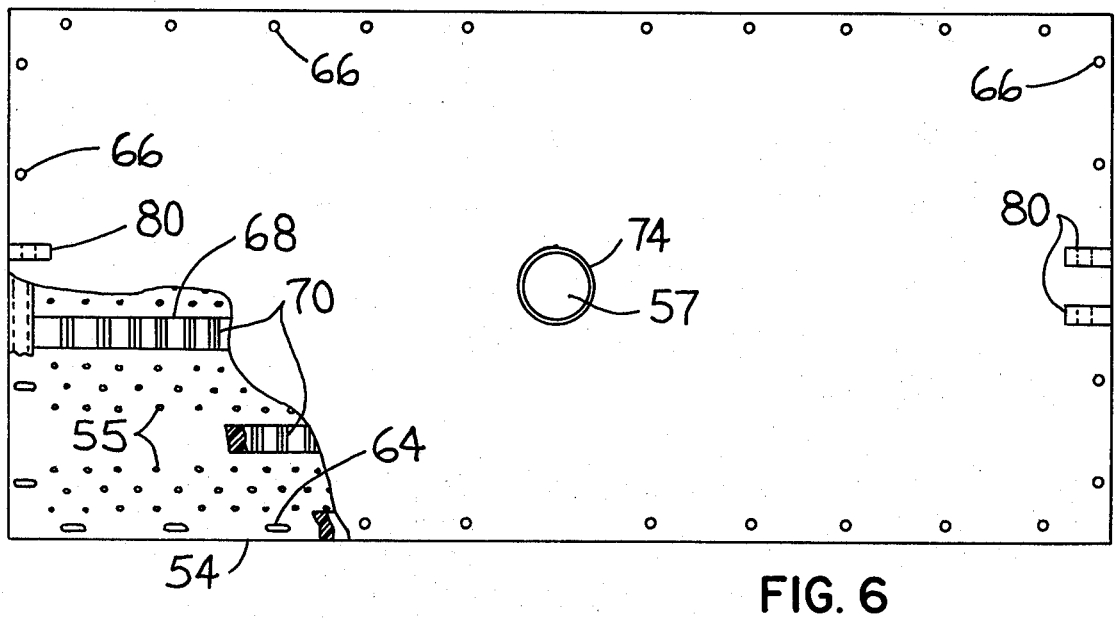
FIG. 6 is a fragmentary plan view of the vacuum mold of FIGS. 4 and 5, with certain parts omitted to show certain interior structural elements more clearly.

Referring now to FIG. 1 of the drawings, an apparatus for heating and shaping sheets of material, such as glass, includes a heating means including a furnace 42 (the exit end of which is shown) through whose exit 43 sheets of glass are conveyed from a loading station (not shown) after being heated to the glass deformation temperature. A cooling station generally indicated at 44 for cooling the curved sheets of glass and an unloading station (not shown) beyond the cooling station 44 are located in end-to-end relation along a transverse path beyond the furnace exit 43 to one side of the furnace 42. A shaping station 46 is located at a corner beyond the furnace exit 43 and to one side of the cooling station 44. A sheet transfer means 47 shown between the cooling station 44 and the shaping station 46 transfers the glass sheet to the cooling station 44.

Heat may be supplied in the furnace 42 by hot gases from gas burners or by electrical radiant heaters or by a combination of both, which heat supply means are well known in the art. The furnace side walls support bearing housings for a horizontal conveyor comprising longitudinally spaced, transversely extending conveyor rolls 48 that define a path of travel which extends through the furnace 42. Additional conveyor rolls 49 are located at the shaping station 46 to form a continuation of the path of travel through the furnace 42. The rolls of the conveyor are arranged in sections and their rotational speed controlled through clutches (not shown) so that the speed of the different conveyor sections may be controlled and synchronized in a manner well known in the art. A glass sensing element S is located near the exit of furnace 42 to initiate a cycle of operation of this apparatus.

Limit switches or electronic controllers may be provided to synchronize the operation of various elements of the apparatus according to a predetermined sequence. Since their arrangement and manner of operation are not part of this invention, they will not be described in detail herein.

The shaping station 46 comprises a deformable upper mold structure 50. The latter is composed of a deformable metal box 52 covered with a blanket of refractory material such as fiber glass (not shown).

The deformable metal box 52 comprises a flexible, apertured, lower metal sheet 54 having perforations 55 distributed throughout, and an upper metal sheet 56 that is also flexible but has a single central aperture 57 therethrough. Upper and lower flexible sheets 54 and 56 are of half hard tempered sheet steel, and are of rectangular outline. The longitudinal side edges of the flexible metal sheets 54 and 56 are spaced along their length by a pair of square solid neoprene bars 58. The latter are ¾ inch (19 millimeters) on edge. The solid neoprene bars 58 are secured by screws 60 that extend through slotted apertures 62 extending vertically through the solid neoprene bars and slotted openings 64 in the lower flexible metal sheet 54 and are received in apertures 66 spaced about the perimeter of the upper metal sheet 56.

Additional longitudinal bars 68 extend parallel to the solid neoprene bars 58 and are approximately one inch (2.5 centimeters) apart. The additional longitudinal neoprene bars 68 are provided with transverse grooves 70 notched across their width dimension of their upper surface portions. In a particular embodiment of this invention, grooves 70 are V-shape in cross section, the depth of the transverse groove 70 and their spacing being such as to assure uniform distribution of positive or negative air pressure to the deformable metal box 52 according to the criteria to be described later.

A pair of transverse hollow metal bars 72 in the form of square members ¾ inch (19 millimeters) wide on each side interconnect the opposite end edge portions of the lower flexible metal sheet 54 and the upper flexible metal sheet 56 by additional screws 60 which are secured in place through vertical holes 73 in the upper and lower walls of the hollow bars 72 and additional screw-receiving holes 66 in the ends of upper sheet 56.

The upper sheet 56 has a central aperture to receive a vacuum pipe 74. The latter communicates with a vacuum exhaust duct 76, which in turn, communicates with a vacuum source (not shown).

A pair of longitudinally spaced brackets 80 is attached to the upper surface of the upper flexible metal sheet 56 near each end thereof. The bracket is apertured to receive a cross-pin 82. The cross-pin is received in a piston head 84. The latter is attached to the bottom of a piston rod 86 which is actuated for movement within a piston housing 88. The latter is pivotally mounted at its upper end to a piston support 90 carried by one of an outer pair of transverse channel irons 92.

The transverse channel irons 92 and 93 run lengthwise parallel to one another and transverse to the length of the deformable metal box 52. The channel irons are attached in spaced relation along their length to the upper edge surface of a longitudinal beam 94, four of which are shown in FIG. 2. Each of the longitudinal beams 94 has a straight upper edge 96 and a curved lower edge 98 (see FIG. 3).

The pistons 88 are mounted intermediate the two centrally disposed longitudinal beams 94. When the piston rods 86 of the pistons 88 are extended, the deformable metal box 52 assumes the position depicted in phantom in FIG. 2 with the lower flexible metal sheet providing a flat surface. Since the lower flexible metal sheet is perforated, when suction is applied through the vacuum duct 76 and vacuum pipe 74 to the deformable metal box 52, a glass sheet G having arrived on the conveyor rolls 49 below the deformable metal box 52 is sucked into engagement against the lower flexible metal sheet 54 by vacuum. When the piston rods 86 of pistons 88 are simultaneously retracted in an upward direction, the deformable metal box 52 deforms so that the upper flexible metal sheet 56 bears upward against the curved lower edge 98 of the longitudinal beams 94, thereby distorting the deformable metal box 52 to conform to the shape of the curved lower edge 98 of the longitudinal beams 94. The glass sheet G, being heat softened, and being sucked into engagement against the lower flexible metal sheet 54, assumes the shape of the lower sheet.

The transverse channel irons 92 are connected to an upper housing 93. The upper housing 93 is thus fixed for vertical movement with the deformable vacuum mold 50 which includes the deformable metal box 52 in whatever shape it is forced to assume by the positions of the piston rods 86 and the piston housing 88. In order to provide the vertical adjustable feature for positioning the deformable vacuum hold 50, a fixed upper support beam 101 is provided.

The beam 101 rests on a pair of transverse horizontal structural beams 103. The latter in turn, are supported on front and rear vertical posts 105, only portions thereof being shown in FIG. 1 in order to provide a clear view of the deformable vacuum mold 50 and its actuating mechanisms. A pair of sleeves 107 are mounted on the upper surface of the upper housing 93. These sleeves receive guide rods 109. Intermediate the sleeves 107, a bracket housing 111 is provided. This bracket housing is pivotally attached to a piston head 112 attached to the bottom of a piston rod 113 which moves vertically within a vertically oriented piston housing 115. The upper end of the piston housing 115 is rigidly attached to the fixed upper support beam 101.

The sheet transfer means 47 comprises a ring-like member 119 conforming in elevation and plan outline to the shape desired immediately inward of the peripheral edge of a glass sheet to be shaped at the shaping station 46. The ring-like member 119 is surrounded by a pipe type reinforcement 121. The ring-like member has an upper edge surface that is notched or serrated to minimize contact with the glass and preferably is constructed in the manner of U.S. Pat. No. 3,973,943 to Samuel L. Seymour. Connectors 122 are provided around the periphery to interconnect the ring-like member 119 and the reinforcement 121. Extension arms 123 extend outward from the opposite longitudinal ends of the outline formed by the sheet transfer means 47 and terminate in internally threaded sleeves 125. The latter are mounted on rotatable drive rods 127 which are actuated for rotation in unison by motor drive means (not shown).

The cooling station 44 comprises an upper plenum 130 connected to an air supply duct 131 which delivers air under pressure from a source of tempering medium (not shown) to said upper plenum 130 for delivery through downwardly directed pipe nozzles 132 toward the upper surface of a glass sheet supported on said member 119. Additional tempering medium supply means communicates with a lower plenum 134 which is provided with upwardly directed nozzles 136 for supplying the tempering medium such as pressurized air against the lower surface of a glass sheet supported on said ring-like member 119.

Cycle of Operation

A plurality of glass sheets are conveyed through the furnace 42 while supported on rotating furnace conveyor rolls 48. When a glass sheet is sensed by the sensing means S, the sheet is transferred to a set of additional conveyor rolls 49 which rotate for sufficient time to bring the glass sheet G into a position immediately below the deformable metal box 52 which occupies the position shown in FIG. 1 and also in phantom in FIG. 3. Suction is supplied through the vacuum pipe 74 and the flexible vacuum conduit 76 to lift the glass sheet while flat into engagement with the deformable metal box 52. The piston rods 86 are retracted upwardly to lift the upper flexible metal sheet 56 into engagement with the curved lower edges 98 of the longitudinal beams 94 and to deform the box 52, thereby causing the glass sheet G to develop the shape to which the deformable metal box 52 is deformed. This shape is depicted in full lines in FIG. 3. Piston rod 113 then rises to lift the entire deformable vacuum mold 50 to provide access for the sheet transfer means 47 to move into position below the deformable vacuum mold at the shaping station 46.

Vacuum is released from the deformable metal box 52 and the shaped glass sheet is dropped upon the ring-like member 119. The rotatable threaded drive rods 127 are rotated in the direction that moves the ring-like member 119 into position between the upper nozzles 132 and lower nozzles 136 so that air or other tempering medium is blasted against the opposite surfaces of the glass sheet supported on the ring-like member 119 at a rate sufficiently rapid to impart a desired degree of temper in the glass. The glass sheet is then removed from the ring-like member 119 and the sheet transfer means 47 is moved into a parking position immediately alongside the additional conveyor rolls 49 to await the arrival of the next glass sheet to be shaped at the shaping station.

Various alternative embodiments may be used in the practice of the present invention. For example, any available energy source such as electricity, gas, oil, coal, etc. may be used to heat the glass sheets within the furnace. Any type of conveyor, such as a gas hearth type of conveyor or a conveyor that uses rolls in conjunction with a fluid that compensates for part of the mass of glass rotatably supported on the rolls of a roller conveyor may be substituted for the roller conveyor system for delivering glass sheets to the shaping station. Furthermore, the deformable vacuum mold of the illustrated embodiment that moves vertically may be replaced by a deformable vacuum mold that maintains a fixed position relative to vertically movable conveyor rolls and the ring-like member may be made of spaced rail sections to provide clearance to lower said rolls and drop a glass sheet from the deformable vacuum box onto the ring-like member and provide clearance for the ring-like member to transfer the glass sheet to the cooling station and to return empty to the shaping station before the vertically movable rolls rise to their glass sheet receiving position in time for the arrival of the next glass sheet to be shaped.

In another embodiment contemplated, the deformable vacuum mold may move horizontally instead of vertically from a first mold position above the additional conveyor rolls to a second mold position above the rail-like member and change its configuration during its horizontal movement.

The cooling station may use liquids or other fluids instead of air as the cooling medium and may use slot type nozzles or bar type nozzles instead of or in combination with the pipe-type nozzles shown.

The form of the invention shown and described in this disclosure represents an illustrative preferred embodiment and certain modifications thereof. It is understood that various additional changes may be made without departing from the gist of the invention as defined in the claimed subject matter which follows.

We claim:

1. A method of shaping a glass sheet comprising:
   (a) delivering a heat-softened flat glass sheet to a shaping station into a position of alignment beneath a deformable vacuum mold having a downwardly facing, apertured, shaping surface capable of defining a flat configuration or a selected curved configuration and of deforming between said flat configuration and said curved configuration,
   (b) engaging said flat glass sheet while the latter is heat-softened with said deformable vacuum mold by applying vacuum therethrough while said apertured shaping surface defines said flat configuration, and
   (c) continuing to engage said heat softened glass sheet and to apply vacuum while deforming said shaping surface from said flat configuration to said curved configuration until said glass sheet changes shape to become a bent glass sheet whose shape conforms approximately to said curved configuration.

2. The method as in claim 1, further including releasing said bent glass sheet after said shaping for conveyance into a cooling station, and cooling said bent glass sheet sufficiently rapidly to impart at least a partial temper thereto.

3. The method as in claim 1 or claim 2, wherein said glass sheet is delivered through a hot atmosphere to said shaping station while supported on a roller conveyor.

4. The method as in claim 1 or claim 2, wherein said glass sheet is delivered through a hot atmosphere to said shaping station while supported on a gas bed.

5. The method as in claim 2, wherein said bent glass sheet is transferred to a ring-like member curved to conform in elevation and outline shape to the shape desired for said glass sheet for support thereby during said conveyance into said cooling station.

6. Apparatus for shaping a flat glass sheet comprising:
   (a) means to heat said glass sheet to the glass deformation temperature,
   (b) means to deliver said flat glass sheet in a heat-softened state to a predetermined position at a shaping station,
   (c) a deformable vacuum mold comprising a deformable box having a downwardly facing, apertured shaping surface capable of deforming between a flat configuration and a curved configuration,
   (d) means for applying vacuum to said box, and
   (e) means operatively connected to said box to deform said downwardly facing, apertured shaping surface,
   whereby on arrival of a glass sheet at said shaping station, said deformable vacuum mold is closely adjacent to the upper surface of said flat glass sheet with said apertured shaping surface defining said flat configuration, said means for applying vacuum applies a vacuum to said box to engage said flat glass sheet against said downwardly facing shaping surface while the latter is in said flat configuration and said means to deform said downwardly facing shaping surface deforms said box to said curved configuration while said vacuum applying means continues to apply vacuum to said box, thereby shaping said flat glass sheet to a bent glass sheet having a curved configuration conforming to said curved configuration.

7. Apparatus as in claim 6, further including:
   (f) means for raising and lowering said vacuum mold between a lowered position adjacent said means to deliver said glass sheet and a raised position spaced vertically from said means to deliver said glass sheet,
   whereby said means for raising and lowering said vacuum mold raises said vacuum mold to said raised position while said means to deform said box is deforming said box.

8. Apparatus as in claim 7, further including:
   (g) a cooling station,
   (h) a glass sheet transfer means movable between said cooling station and to a position below said deformable vacuum mold at said shaping station,
   whereby said vacuum mold in said raised position provides clearance for said glass sheet transfer means to move into said predetermined position below said vacuum mold at said shaping station, whereby upon arrival of said glass sheet transfer means at said predetermined position, said vacuum applying means stops applying vacuum and allows said bent glass sheet to drop onto said glass sheet transfer means, said glass sheet transfer means with said bent glass sheet supported thereon moves to said cooling station and tempering medium is applied to said hot, bent glass sheet at a rate rapid enough to impart at least a partial temper in the glass sheet.

9. Apparatus as in claim 8, further including means to pressurize said vacuum mold to help release said bent glass sheet therefrom and to drop said bent glass sheet onto said glass sheet transfer means with a velocity greater than that obtained from the forced of gravity.

* * * * *